United States Patent
Robison et al.

[11] 3,719,683
[45] March 6, 1973

[54] IMIDAZO(4,5-B)PYRIDINES

[75] Inventors: Michael Mullen Robison, Riehen, Switzerland; Neville Finch, West Orange, N.J.

[73] Assignee: Ciba-Geigy Corporation, Ardsley, N.Y.

[22] Filed: Nov. 20, 1970

[21] Appl. No.: 91,595

[52] U.S. Cl. ...... 260/294.8 C, 260/243 B, 260/247.1, 260/268 H, 260/293.59, 260/295 F, 424/246, 424/248, 424/250, 424/266, 424/267

[51] Int. Cl. .............................................. C07d 31/50

[58] Field of Search ....... 260/295 BL, 295 F, 294.8 C

[56] References Cited

UNITED STATES PATENTS 3,590,045   6/1971   Berthold .......................... 260/295 F

*Primary Examiner*—Alan L. Rotman
*Attorney*—Harry Goldsmith, Joseph G. Kolodny and Mario A. Monaco

[57] ABSTRACT

1-Aminoalkyl-2,3-dihydro-imidazo[4,5-b]pyridines, e.g. those of the formula

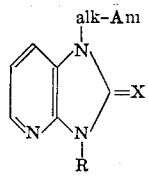

Am = an amino group
alk = alkylene with at least 2C
X = O or S
R = H, aliphatic, araliphatic or aromatic radical
acyl derivatives, N-oxides, quaternaries or salts thereof are antidepressants.

4 Claims, No Drawings

IMIDAZO(4,5-B)PYRIDINES

SUMMARY OF THE INVENTION

The present invention concerns and has for its object the provision of new 1-aminoalkyl-2,3-dihydroimidazo[4,5-b]pyridines, preferably of those corresponding to Formula I

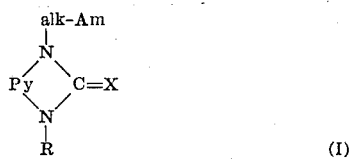

(I)

in which Py is a 2,3-pyridylene radical, Am is an amino group, alk is lower alkylene separating the adjacent nitrogen atoms by at least 2 carbon atoms, X is oxygen or sulfur and R is hydrogen or an aliphatic, cycloaliphatic, araliphatic or aromatic radical, of acyl derivatives, N-oxides, quaternaries and salts thereof, as well as of corresponding pharmaceutical compositions and of methods for the preparation and application of these products. Said products of the invention exhibit antidepressant effects in mammals and are useful for this purpose.

DESCRIPTION OF THE PREFERRED EMBODIMENT

The 2,3-pyridylene radical Py is preferably unsubstituted, but can also be substituted in the remaining 3 positions by one or more than one, preferably one substituent selected, for example, from lower alkyl, e.g., methyl, ethyl, n- or i-propyl or -butyl, or free, etherified or esterified hydroxy, such as lower alkoxy, e.g., methoxy, ethoxy, n- or i-propoxy or -butoxy, or halogeno, e.g., fluoro, chloro or bromo. Most preferred radicals Py are 2,3-pyridylene or (lower alkyl)-2,3-pyridylene, e.g., 4-, 5- or 6-methyl-2,3-pyridylene. The term "lower", referred to above and hereinafter in connection with organic radicals or compounds respectively, defines such with up to seven, preferably up to four, carbon atoms.

The amino group Am is a primary, preferably a secondary or tertiary amino group such as mono- or di-lower alkylamino, e.g., methylamino, ethylamino, n-propylamino or i-butylamino; dimethylamino, N-methyl-N-ethylamino, diethylamino, di-n- or i-propylamino or di-n-butylamino; lower alkyleneimino, e.g., pyrrolidino, piperidino, 1,4-pentyleneimino, 2,5- or 1,6-hexyleneimino or 2,6-heptyleneimino, or lower monoaza-, -oxa- or -thiaalkyleneimino or N-(lower alkyl or hydroxylower alkyl)-monoaza-alkyleneimino, wherein 2 heteroatoms are separated by at least two carbon atoms, e.g., piperazino, 4-(methyl, ethyl or 2-hydroxyethyl)-piperazino, 3-aza-1,6-hexyleneimino, 3-(methyl or ethyl)-3-aza-1,6-hexyleneimino, 4-aza-1,7-heptyleneimino or 4-(methyl or ethyl)-4-aza-1,7-heptyleneimino, morpholino, 3,5-dimethyl-morpholino or thiamorpholino.

The lower alkylene radical alk separating the adjacent nitrogen atoms by at least 2 carbon atoms represents, for example, 1,2-ethylene, 1,2- or preferably 1,3-propylene, but also 1,2-, 1,3-, 1,4- or 2,3-butylene, 1,2-, 1,3-, 1,4-, 1,5-, 2,3- or 2,4-pentylene, -hexylene or -heptylene.

An aliphatic radical R is preferably lower alkyl or alkenyl, e.g., that mentioned above, allyl or methallyl respectively. R preferably represents a 3 to 7 ring-membered cycloalkyl or cycloalkenyl radical, e.g., cyclopropyl, cyclopentyl, cyclohexyl or cycloheptyl; 1-cyclopentenyl, 1-cyclohexenyl or 1-cycloheptenyl; or a Ph-lower alkyl or advantageously Ph radical, which latter is an unsubstituted or substituted phenyl radical containing one or more than one, preferably up to three of the same or different substituents, such as the lower alkyl, free, etherified or esterified hydroxy, amino, mono- or di-lower alkylamino groups mentioned above or trifluoromethyl. Preferred araliphatic or aromatic radicals are represented by $Ph_1-C_mH_{2m}-$, wherein $m$ is an integer from 0 to 2, $Ph_1$ is phenyl, (lower alkyl)$_n$-phenyl, (hydroxy)$_n$-phenyl, (lower alkoxy)$_n$-phenyl, (halogeno)$_n$-phenyl, (trifluoromethyl)-phenyl or (amino)-phenyl and $n$ is an integer from 1 to 3.

Acyl derivatives of primary or secondary amines of Formula I are preferably those of aliphatic or araliphatic carboxylic or sulfonic acids, such as of lower alkanoic, lower alkanesulfonic, Ph-lower alkanoic or Ph-sulfonic acids, e.g., of acetic, propionic, pivalic, methanesulfonic, ethanesulfonic, benzoic, phenylacetic or p-toluenesulfonic acid.

Quaternaries and salts of the compounds of Formula I are preferably lower alkyl or Ph-lower alkyl quaternaries and acid addition salts.

The compounds of the invention exhibit valuable pharmacological properties, for example, imipramine-type antidepressant effects. This can be demonstrated in animal tests, using advantageously mammals, such as mice, rats or monkeys, as test objects. The compounds of the invention can be applied to the animals enterally, e.g., orally, or parenterally, e.g., subcutaneously or intraperitoneally, for example, in the form of aqueous solutions or suspensions. The dosage may range in the lower animals, e.g., mice or rats, between about 1 and 400 mg/kg/day, preferably between about 2.5 and 100 mg/kg/day, and in the higher animals, e.g., monkeys, advantageously between about 5 and 25 mg/kg/day. Besides some depressant activity, as recorded by the mice jiggle cage test system, where the spontaneous movements of the animals are registered, and an antagonizing effect of the tetrabenazine-induced ptosis in mice, the compounds of the invention exhibit antidepressant effects, which can be observed, for example, according to the amphetamine interaction test in rats (P. Carlton, Psychopharmacologia 1961, Vol. II, p. 364). Thus, for example, oral administration of about 400 mg/kg/day of the 1-(3-dimethylaminopropyl)-2-oxo-3-phenyl-2,3-dihydroimidazo[4,5-b]pyridine dicyclohexylsulfamate monohydrate, a characteristic compound of the invention, to mice causes a marked reduction of their spontaneous movements, and about 100 mg/kg/day orally antagonize markedly the tetrabenzine effects. When applied intraperitoneally to rats at a dose of 10 mg/kg/day, it increases their rate in lever pressing activity and shock avoidance according to the amphetamine interaction test. Accordingly, the compounds of the invention are useful antidepressants in the treatment or management of exo- or endogenous depressions, but also valuable intermediates in the preparation of other useful products, especially of pharmacologically active compounds.

Particularly useful are compounds of Formula I, in which Py is 2,3-pyridylene or (lower alkyl)-2,3-pyridylene, Am is amino, mono or di-lower alkylamino, lower alkyleneimino, lower monoaza-, -oxa- or -thiaalkyleneimino or N-(lower alkyl or hydroxylower alkyl)-monoazaalkyleneimino wherein the heteroatoms are separated from each other by at least two carbon atoms, alk is lower alkylene separating the adjacent nitrogen atoms by at least two carbon atoms, X is oxygen or sulfur and R is 5 to 7 ring-membered cycloalkyl, cycloalkenyl or $Ph_1-C_mH_{2m}-$, wherein m is an integer from 0 to 2, $Ph_1$ is phenyl, (lower alkyl)$_n$-phenyl, (hydroxy)$_n$-phenyl, (lower alkoxy)$_n$-phenyl, (halogen)$_n$-phenyl, (trifluoromethyl)-phenyl or (amino)-phenyl and n is an integer from 1 to 3, the lower alkanoyl or $Ph_1$-lower alkanoyl derivatives of the compounds containing at least one hydrogen bound to nitrogen, the N-oxide, lower alkyl or $Ph_1$-lower alkyl quaternaries of the compounds containing no hydrogen bound to nitrogen or therapeutically acceptable acid addition salts thereof.

Preferred compounds of the invention are those of Formula II

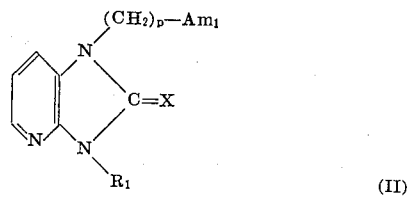

(II)

in which $Am_1$ is mono- or dialkylamino, 5 to 7 ring-membered alkyleneimino, piperazino, 4-alkylpiperazino, morpholino or thiamorpholino, p is an integer from 2 to 4, X is oxygen or sulfur, $R_1$ is 5 to 7 ring-membered cycloalkyl or 1-cycloalkenyl, benzyl, (alkyl)-benzyl, (alkoxy)-benzyl, (halogeno)-benzyl, phenyl, (alkyl)-phenyl, (alkoxy)$_n$-phenyl or (halogeno)-phenyl, wherein alkyl contains up to four carbon atoms and n is an integer from 1 to 3, or therapeutically acceptable acid addition salts thereof.

Especially valuable compounds are those of Formula II, wherein $Am_1$ is mono- or dimethylamino, pyrrolidino, piperidino, piperazino or 4-methylpiperazino, p is the integer 2 or 3, X is oxygen or sulfur, $R_1$ is cyclopentyl, cyclohexyl, 1-cyclohexenyl, benzyl, (chloro)-benzyl, phenyl, (methoxy)-phenyl, (fluoro)-phenyl or (chloro)-phenyl or therapeutically acceptable acid addition salts thereof.

The compounds of this invention are prepared according to methods known per se. For example, they are obtained by a. converting in a compound of Formula III

(III)

in which $Y_1$ is a moiety capable of being converted into alk-Am, $Y_1$ into said aminoalkyl group or b. ring-closing a compound of Formula IV

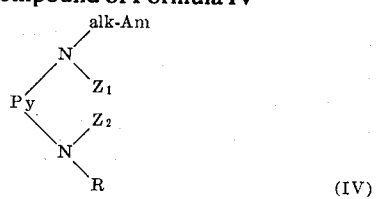

(IV)

wherein one of $Z_1$ and $Z_2$ is hydrogen and the other is a reactive, functionally converted carboxy group and, if desired, converting any resulting compound into another compound of the invention.

Compounds of Formula III are advantageously reacted with such of the formula $Y_2$—Am, wherein one of $Y_1$ and $Y_2$ is hydrogen and the other a reactively esterified alk—OH group, advantageously such derived from a strong inorganic acid, particularly a hydrohalic, e.g., hydrochloric or hydrobromic acid, sulfuric or a sulfonic acid, such as a lower alkane or benzene sulfonic acid, e.g., methane, ethane, benzene or p-toluene sulfonic acid. Instead of using the reactive ester of the alcohol HO-alk-Am, also a reactive condensation product thereof can be used, for example the cyclic product

wherein Im is imino corresponding to Am, advantageously unsubstituted or correspondingly substituted ethyleneimino.

Another moiety Y is such convertible into alk-Am by hydrogenation, for example a nitroalkyl, iminoalkyl or oximino-alkyl group. The respective nitro compounds, Schiff's bases or oximes are advantageously reduced with the use of catalytically activated or nascent hydrogen, e.g., hydrogen in the presence of nickel, palladium or platinum catalysts or hydrogen generated electrolytically or by the action of metals on acids or alcohols, e.g., zinc or iron and strong inorganic or organic acids, such as hydrohalic or lower alkanoic acids, or alkali metals, aluminum or their amalgams and lower alkanols.

In the compounds of Formula IV, the reactively converted carboxy group $Z_1$ and $Z_2$ is advantageously a lower carbalkoxy group and the ring-closure is brought about at elevated temperatures, for example between about 50° and 300° C., advantageously between about 100° and about 200° C.

The compounds of the invention so obtained can be converted into each other according to methods known per se. For example, resulting primary, secondary or tertiary amines can be reacted with reactive esters of the corresponding alcohols, with lower alkyleneoxides, e.g., ethyleneoxide, or with aldehydes or ketones and reducing agents, e.g., formic acid or its functional derivatives or nascent hydrogen, in order to obtain secondary or tertiary amines, or quaternaries respectively. Resulting primary or secondary amines can also be acylated, for example, with the use of the corresponding acid halides or anhydrides, or acyl derivatives obtained hydrolyzed, e.g., with acids or alkalies, or reduced with simple or complex light metal hydrides. Resulting compounds in which X is oxygen, can be converted into the corresponding sulfur compounds, for example, by reacting them with sulfurization agents, such as phosphorus pentasulfide, or resulting sulfur compounds treated with desulfurization agents, such as lead or mercury oxide. Resulting tertiary amines can be converted into N-oxides, e.g., by reaction with oxidizing agents, such as hydrogen peroxide or peracids, e.g., aliphatic or aromatic percarboxylic acids.

A resulting compound can also be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g., a metal hydroxide, ammonia or a hydroxyl ion exchange preparation. Therapeutically useful acids are, for example, inorganic acids, e.g., hydrochloric, hydrobromic, sulfuric, phosphoric, nitric or perchloric acid, or organic acids, e.g., carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g., by fractional distillation, crystallization and/or chromatography. Racemic products can likewise be resolved into the optical antipodes, for example by separation of diastereomeric salts thereof, e.g., by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. The compounds of Formula III, in which $Y_1$ or $Y_2$ is hydrogen, are advantageously used in the form of their alkali metal, e.g., sodium or potassium salts. Those starting materials are preferably used, which lead to those compounds of the invention, which are indicated above as the preferred embodiments of the invention.

The starting material used is known or, if new, may be prepared according to methods known per se. For example, the starting material mentioned under item a) is prepared analogous to the reactions described in Ber. 72, 936 (1939). The corresponding 2,3-pyridinediamines, described therein, are then converted into compounds of Formula III, wherein $Y_1$ is hydrogen, by reaction with a reactive carbonic or thiocarbonic acid derivative, advantageously 1,1'-carbonyl-diimidazole. Said compounds are new and are also intended to be included within the scope of the present invention. They are also pharmacologically active compounds, showing effects similar, or even identical, to those exhibited by the compounds of Formula I. Compounds of Formula III, in which $Y_1$ is different from hydrogen are prepared from the former unsubstituted compounds ($Y_1$=H), or advantageously their sodium salts, by reacting them with a reactive mixed ester of a lower alkylene glycol, e.g., 3-bromo-propyl chloride, or a reactive ester of a lower nitroalkanol or a hydroxyalkanal or -alkanone and the resulting aldehyde or ketone is condensed with H-Am.

The compounds of Formula IV are advantageously prepared from corresponding diamines (in which both of $Z_1$ and $Z_2$ are hydrogen) and reactive carbonic acid derivatives, advantageously haloformiates, e.g., lower alkyl-chloroformiates.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., magnesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are parts by weight.

EXAMPLE 1

To the mixture of 5.3 g of 2-oxo-3-cyclohexyl-2,3-dihydroimidazo[4,5-b]pyridine and 150 ml of dimethylformamide, 1.3 g of 50 percent sodium hydride in mineral oil are added portionwise while stirring under nitrogen for 1 hour. Hereupon 3.3 g of 3-dimethylaminopropyl chloride are added and the mixture stirred overnight at about 50°. It is evaporated under reduced pressure, the residue taken up in 5 percent hydrochloric acid, the solution washed with petroleum ether and made basic with concentrated aqueous potassium carbonate. The mixture is extracted with methylene chloride, the extract dried and evaporated. The residue is taken up in 40 ml of acetone, the solution combined with 3.56 g of cyclohexylsulfamic acid in 35 ml of acetone, the precipitate formed filtered off and recrystallized from methanol-acetone, to yield the 1-(3-dimethylaminopropyl)-2-oxo-3-cyclohexyl-2,3-dihydroimidazo[4,5-b]pyridine cyclohexylsulfamate hemihydrate of the formula

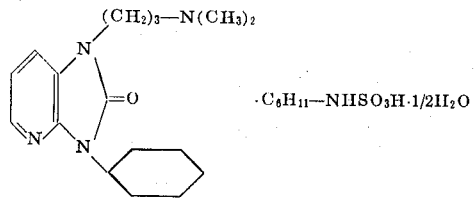

melting at 117°–120°.

In the analogous manner, the 1-(2-dimethylaminoethyl)-2-oxo-3-cyclohexyl-imidazo[4,5-b]pyridine is obtained, whose maleate monohydrate melts at 153° (methanol).

The starting material is prepared as follows: To the mixture of 32.7 g of 2-chloro-3-nitropyridine and 300 ml of benzene, 80 g of cyclohexylamine are added while stirring under nitrogen, the mixture allowed to stand for 3 hours and refluxed for 3½ hours. After standing overnight, it is filtered and the filtrate evaporated under reduced pressure, to yield the 2-cyclohexylamino-3-nitropyridine.

The mixture of 6.63 g thereof, 1 g of 10 percent palladium on charcoal and 100 ml of 95 percent aqueous ethanol is hydrogenated at 3 at and room temperature until the hydrogen uptake ceases. It is filtered, the filtrate concentrated and the precipitate formed filtered off, to yield the 3-amino-2-cyclohexylaminopyridine, melting at 117°–118°.

The mixture of 1.91 g thereof, 1.62 g of 1,1'-carbonyldiimidazole and 40 ml of dry methylene chloride is allowed to stand overnight at room temperature and evaporated under reduced pressure. The residue is triturated with water and recrystallized from ethanolacetonitrile, to yield the 2-oxo-3-cyclohexyl-2,3-dihydro-imidazo[4,5-b]pyridine, melting at 226°–228°.

This starting material can also be prepared as follows: The mixture of 5.45 g of 2,3-diaminopyridine, 8.5 g of 2-oxocyclohexanecarboxylic acid ethyl ester and 40 ml of xylene is refluxed under nitrogen for 2.5 hours on a water trap. It is cooled, filtered, the residue washed with benzene and purified by preparative thin-layer chromatography, using silica gel as stationary and chloroform-methanol (9:1) as the mobile phase, to yield as the major fraction the 2-oxo-3-cyclohex-1-enyl-2,3-dihydro-imidazo[4,5-b]pyridine, melting at 193°–194.5°, and a minor amount of the 2-oxo-1-cyclohex-1-enyl-2,3-dihydro-imidazo[4,5-b]pyridine melting at 200°–202°, both after recrystallization from acetonitrile.

0.43 g of said major component is hydrogenated in 20 ml of glacial acetic acid over 0.1 g of 10 percent palladium on charcoal until the theoretical amount of hydrogen has been absorbed. The mixture is filtered, the filtrate evaporated under reduced pressure, the residue washed with water and recrystallized from acetonitrile, to yield the 2oxo-3-cyclohexyl-2,3-dihydro-imidazo[4,5-b]pyridine, melting at 227°–228°.

In the analogous manner, the 2-oxo-1- and 3-cyclohept-1-enyl-2,3-dihydro-imidazo[4,5-b]pyridines are obtained melting at 146.5°–148° and 122°–124° respectively after thin-layer separation and recrystallization from acetonitrile.

EXAMPLE 2

To the mixture of 2.6 g of 2-oxo-3-benzyl-2,3-dihydroimidazo[4,5-b]pyridine and 50 ml of dimethylformamide, 0.42 g of 50 percent sodium hydride in mineral oil are added while stirring under nitrogen for 1 hour. Hereupon 1.06 g of 3-dimethylaminopropyl chloride are added and the mixture stirred overnight at about 50°. It is evaporated under reduced pressure, the residue taken up in 5 percent hydrochloric acid, the solution washed with petroleum ether and made basic with concentrated aqueous potassium carbonate. The mixture is extracted with methylene chloride, the extract dried and evaporated. The residue is taken up in the minimum amount of acetone, the solution combined with the saturated solution of 1.83 g of cyclohexylsulfamic acid in acetone and the precipitate formed filtered off, to yield the 1-(3-dimethylaminopropyl)-2-oxo-3-benzyl-imidazo[4,5-b]pyridine cyclohexylsulfamate of the formula

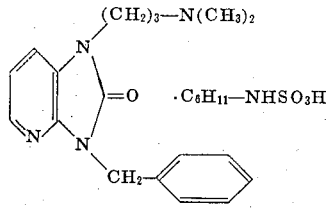

melting at 138°–139°.

The starting material is prepared as follows: To the mixture of 25 g of 2-chloro-3-nitropyridine and 125 ml of 95 percent aqueous ethanol, 67 g of benzylamine are added and the mixture stirred and refluxed under nitrogen for 5 hours. Hereupon it is cooled, filtered and the residue recrystallized from methanol-acetonitrile, to yield the 2-benzylamino-3-nitropyridine, melting at 75°–77.

The mixture of 10 g thereof, 2 g of 10 percent palladium on charcoal and 1 liter of 95 percent aqueous ethanol is hydrogenated at room temperature and 3 at until the hydrogen uptake ceases. It is filtered, the filtrate evaporated under reduced pressure and the residue recrystallized from cyclohexane, to yield the 3-amino-2-benzylaminopyridine melting at 92°–93°.

The mixture of 7 g thereof, 6.7 g of 1,1'-carbonyldiimidazole and 250 ml of dry methylene chloride is stirred at room temperature overnight. It is evaporated, the residue triturated with water and recrystallized from ethanol, to yield the 2-oxo-3-benzyl-2,3-dihydroimidazo[4,5-b]pyridine, melting at 186°.

In the analogous manner, the 2-oxo-3-(4-chlorobenzyl)-2,3-dihydro-imidazo[4,5-b]pyridine is obtained, m.p. 216° (methanol-acetonitrile), but using advantageously platinum instead of palladium in the reduction step.

EXAMPLE 3

To the solution of 2.06 g of 2-oxo-3-phenyl-2,3-dihydroimidazo[4,5-b]pyridine in 50 ml of dimethylformamide, 0.52 g of 50 percent sodium hydride in mineral oil are added while stirring under nitrogen at room temperature. After 1 hour, 1.32 g of 2-dimethylaminoethyl chloride are added and the mixture stirred at about 50° overnight. It is evaporated under reduced pressure, the residue taken up in 5 percent hydrochloric acid, the solution washed with petroleum ether and made basic with concentrated aqueous potassium carbonate. The mixture is extracted with methylene chloride, the extract dried and evaporated. The residue is taken up in 10 ml of acetone, the solution of 3.58 g of cyclohexylsulfamic acid in 30 ml of acetone is added, the precipitate formed filtered off and recrystallized from methanol-acetone, to yield the 1-(2-dimethylaminoethyl)-2-oxo-3-phenyl-2,3-dihydro-imidazo[4,5-b]pyridine dicyclohexylsul-famate of the formula

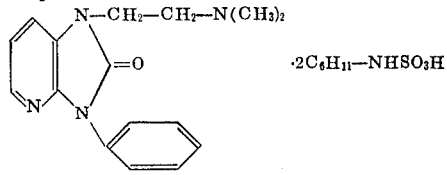

melting at 153–156°.

The starting material is prepared as follows: The mixture of 50 g of 2-chloro-3-nitropyridine, 117 g of aniline and 500 ml of 95 percent aqueous ethanol is refluxed under nitrogen for 7 hours and allowed to stand overnight at room temperature. It is chilled, the precipitate formed filtered off and recrystallized from cyclohexane, to yield the 2-phenylamino-3-nitropyridine melting at 74°–76°.

The mixture of 7.9 g thereof, 100 ml of 95 percent aqueous ethanol and 0.5 g of 10 percent palladium on charcoal is hydrogenated at 3 at and room temperature for 10 minutes. It is filtered and the filtrate evaporated, to yield the 3-amino-2-phenylaminopyridine melting at 142°–143.5°.

The mixture of 6.74 g thereof, 7 g of 1,1'-carbonyldiimidazole and 250 ml of dry methylene chloride is stirred overnight at room temperature and evaporated under reduced pressure. The residue is triturated with water and recrystallized from acetonitrile, to yield the 2-oxo-3-phenyl-2,3-dihydro-imidazo[4,5-b]-pyridine melting at 239.5°–241°.

EXAMPLE 4

To the mixture of 1.9 g of 2-thiono-3-phenyl-2,3-dihydroimidazo[4,5-b]pyridine and 50 ml of dimethylformamide, 0.42 g of 50 percent sodium hydride in mineral oil are added while stirring under nitrogen at room temperature. After ½hour 1.5 g of 3-(4-methylpiperazino)-propyl chloride are added and the mixture stirred at about 50° overnight. After cooling 60 ml of N hydrochloric acid are added, the mixture washed with petroleum ether and made basic with solid potassium carbonate. It is extracted with methylene chloride, the extract dried and evaporated. The residue is taken up in the minimum amount of acetone, the solution combined with 2.8 g of maleic acid in the minimum amount of acetone, the precipitate formed filtered off and recrystallized from methanol-acetonitrile, to yield the 1-[3-(4-methylpiperazino)-propyl]-2-thiono3-phenyl-2,3-dihydro-imidazo[4,5-b]pyridine dimaleate of the formula

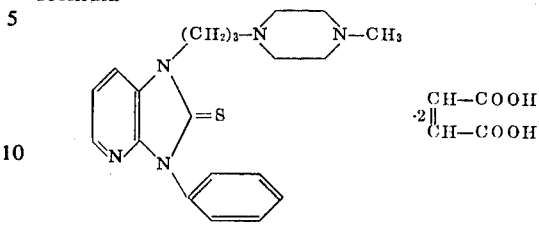

melting at 199°–201°.

The starting material is prepared as follows: The mixture of 15 g of 2-oxo-3-phenyl-2,3-dihydro-imidazo[4,5-b]pyridine, 16.5 g of phosphorus pentasulfide and 75 ml of pyridine is refluxed for 15 hours, cooled and diluted with 75 ml of water. The precipitate formed is filtered off, washed with water and recrystallized from methanol-acetonitrile, to yield the 2-thiono-3-phenyl-2,3-dihydro-imidazo[4,5-b]pyridine melting at 293°–295°.

According to the same method the 2-thiono-3-(3-chlorophenyl)-2,3-dihydro-imidazo[4,5-b]pyridine is obtained, melting at 288°–290°.

EXAMPLE 5

According to the methods illustrated by the previous examples, the following compounds of Formula II are prepared: $p=3$

| No. | R₁ | Am₁ | X | salt | m.p. °C | Recryst. from |
|---|---|---|---|---|---|---|
| 1 | phenyl | N(CH₃)₂ | O | 2A.H₂O | 146 | C-E |
| 2 | 4-CH₃O-phenyl | " | O | 2A | 157 | C-E |
| 3 | 3,4,5-(CH₃O)₃-phenyl | " | O | B | 146.5 | D |
| 4 | " | ⟨N⟩N—CH₃ | O | 2B | 212 (dec) | D-H₂O |
| 5 | phenyl | " | O | B | 198 | D |
| 6 | 2-F-phenyl | " | O | 2B | 196–198 | C-F |
| 7 | " | N(CH₃)₂ | O | 2A | 152 | E |
| 8 | 4-F-phenyl | " | O | 2A | 164 | C-E |
| 9 | 2-Cl-phenyl | " | O | 2A | 165 | C-E |
| 10 | 3-Cl-phenyl | " | O | 2A | 146 | C-E |
| 11 | phenyl | " | S | 2A | 145 | F-I |

A = cyclohexylsulfamic acid, B = maleic acid, C = methanol, D = ethanol, E = acetone, F = acetonitrile, G = cyclohexane, H = benzene, I = diethyl ether, J = petroleum ether and K = n-propanol.

The corresponding intermediates have the following characteristics:

| No. | m.p. °C nitroamine | Recr. from | m.p. °C diamine | Recr. from | m.p. °C III, Y₁=H | Recr. from |
|---|---|---|---|---|---|---|
| 1,5 | 74–76 | G | 142–143.5 | D | 239.5–241 | F |
| 2 | 97–99 | C | 170–172 | E | 256–257 | D-F |
| 3,4 | 140–141 | D | 147 | E-H | 268.5 | C |
| 6,7 | 103 | K | 149 | D | 203 | C-H₂O |
| 8 | 131–133 | D-F | 164–166 | H | 266–267 | C-F |
| 9 | 131 | C-CH₂Cl₂ | 100 | D-H₂O | 243–245 | C-F |
| 10 | 133 | " | 126 | " | 263 | C-F |
| 11 | 74–76 | G | 142–143.5 | D | 293–295 | C-F |

EXAMPLE 6

In the analogous manner, illustrated by the previous examples, the following compounds are prepared from equivalent amounts of the starting materials described therein:

a. 1-(2-diethylaminopropyl)-2-oxo-3-cyclohex-1-enyl-2,3-dihydroimidazo[4,5-b]pyridine;
b. 1-(3-pyrrolidinopropyl)-2-oxo-3-cyclohept-1-enyl-2,3-dihydroimidazo[4,5-b]pyridine;
c. 1-(2-piperidinoethyl)-2-oxo-3-(4-chlorobenzyl)-2,3-dihydroimidazo[4,5-b]pyridine;
d. 1-(4-dimethylaminobutyl)-2-thiono-3-(3-chlorophenyl)-2,3-dihydro-imidazo[4,5-b]pyridine;
e. 1-(2-aminoethyl)-2-oxo-3-(3,4,5-trimethoxypheyl)-2,3-dihydroimidazo[4,5-b]pyridine;
f. 1-(3-methylaminopropyl)-2-oxo-3-(4-tolyl)-2,3-dihydroimidazo[4,5-b]pyridine;
g. 1-{3-[4-(2-hydroxyethyl)-piperazino]-propyl}-2-oxo-3-phenyl-2,3-dihydro-imidazo[4,5-b]pyridine,
h. 1-(3-morpholinobutyl)-2-oxo-3-phenyl-5-methyl-2,3-dihydroimidazo[4,5-b]pyridine;
i. 1-(2-thiamorpholinopropyl)-2-oxo-3-(3-trifluoromethylphenyl)-2,3-dihydroimidazo[4,5-b]pyridine;
j. 1-(2-i-propylaminoethyl)-2-oxo-3-(4-dimethylaminophenyl)-2,3-dihydro-imidazo[4,5-b]pyridine.

EXAMPLE 7

Preparation of 10,000 tablets each containing 50.0 mg of the active ingredient:

| Formula: | |
|---|---|
| 1-(3-dimethylaminopropyl)-2-oxo-3-phenyl-2,3-dihydro-imidazo[4,5-b]pyridine dicyclohexylsulfamate monohydrate | 500.00 g |
| Lactose | 1,706.00 g |
| Corn starch | 90.00 g |
| Polyethylene glycol 6,000 | 90.00 g |
| Talcum powder | 90.00 g |
| Magnesium stearate | 24.00 g |
| Purified water | q.s. |

PROCEDURE:

All the powders are passed through a screen with an opening of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

We claim
1. A 1-aminoalkyl-2,3-dihydro-imidazo-[4,5-b]pyridine of the formula

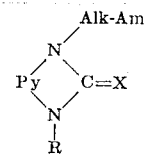

in which Py is unsubstituted 2,3-pyridylene or [such radical substituted by a member selected from the group consisting of lower alkyl, hydroxy, lower alkoxy or halogeno,] (lower alkyl)-2,3-pyridylidene, Am is amino, mono or di-lower alkylamino, [lower alkyleneimino, lower monoaza-, -oxa- or -thiaalkyleneimino or N-(lower alkyl or hydroxylower alkyl)-monoazaalkyleneimino where the heteroatoms are separated from each other by at least 2 car-bon atoms,] alk is lower alkylene separating the adjacent nitrogen atoms by at least 2 carbon atoms, X is oxygen or sulfur and R is [hydrogen, lower alkyl, lower alkenyl, 3]5 to 7 ring-membered cycloalkyl or cycloalkenyl or $Ph_1$-$C_mH_{2m}$-, wherein m is an integer from 0 to 2, $Ph_1$ is phenyl, (lower alkyl)$_n$-phenyl, (hydroxy)$_n$-phenyl, (lower alkoxy)$_n$-phenyl, (halogeno)$_n$-phenyl, (trifluoromethyl)-phenyl or (amino)-phenyl and n is an integer from 1 to 3, N-oxides, or therapeutically acceptable acid addition salts thereof.

2. A compound as claimed in claim 1 and having the formula

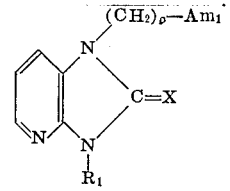

in which $Am_1$ is mono- or diloweralkylamino, p is an integer from 2 to 4, X is oxygen or sulfur, $R_1$ is 5 to 7 ring-membered cycloalkyl or 1-cycloalkenyl, benzyl, (alkyl)-benzyl, (alkoxy)-benzyl, (halogeno)-benzyl, phenyl, (alkyl)-phenyl, (alkoxy)$_n$-phenyl or (halogeno)-phenyl, wherein alkyl contains up to four carbon atoms and n is an integer from 1 to 3, or therapeutically acceptable acid addition salts thereof.

3. A compound as claimed in claim 3, in which formula $Am_1$ is mono- or dimethylamino, p is the integer 2 or 3, X is oxygen $R_1$ is cyclopentyl, cyclohexyl, cycloheptyl, benzyl, (chloro)- benzyl, phenyl, (methoxy)$_n$-phenyl, (fluoro)-phenyl or (chloro)-phenyl and n is an integer from 1 to 3, or therapeutically accept-able acid addition salts thereof.

4. A compound as claimed in claim 4, and being the 1-(3-dimethylaminopropyl)-2-oxo-3-phenyl-2,3-dihydro-imidazo[4,5-b]-pyridine or a therapeutically acceptable acid addition salt thereof.

* * * * *

PO-1050
(5/69)

UNITED STATES PATENT OFFICE
CERTIFICATE OF CORRECTION

Patent No. 3,719,683      Dated  March 6, 1973

Inventor(s)   Michael Mullen Robison et al

It is certified that error appears in the above-identified patent and that said Letters Patent are hereby corrected as shown below:

Column 12, lines 10-21, delete all portions within brackets;
line 45, delete "claim 3" and substitute --- claim 2 ---;
line 52, delete "claim 4" and substitute --- claim 3 ---.

Signed and sealed this 14th day of May 1974.

(SEAL)
Attest:

EDWARD M. FLETCHER, JR.
Attesting Officer

C. MARSHALL DANN
Commissioner of Patents